Figure 1:
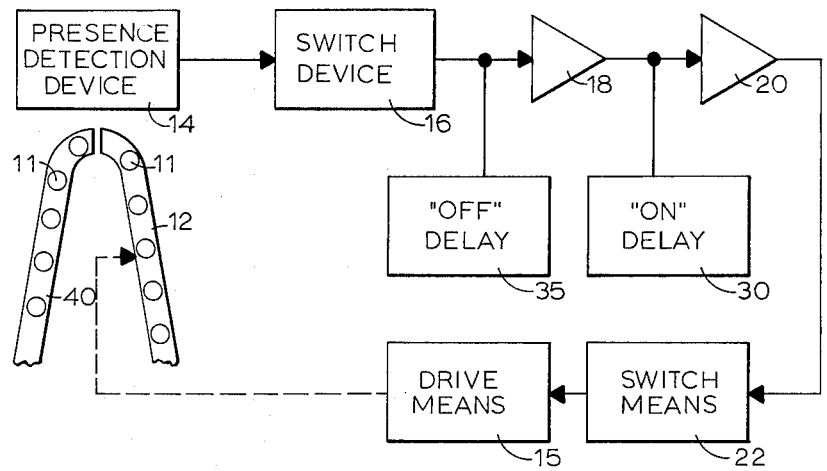

Oct. 19, 1965   R. B. METZ   3,212,622
SPACING CONTROL CIRCUIT
Filed Dec. 3, 1963   3 Sheets-Sheet 1

INVENTOR.
RAMEY B. METZ
BY Edward A. Sokolski
ATTORNEY

INVENTOR.
RAMEY B. METZ
BY
*Edward A. Sokolski*
ATTORNEY

United States Patent Office 3,212,622
Patented Oct. 19, 1965

3,212,622
SPACING CONTROL CIRCUIT
Ramey B. Metz, Anaheim, Calif., assignor to Tamar Electronics Industries, Inc., Anaheim, Calif., a corporation of Delaware
Filed Dec. 3, 1963, Ser. No. 327,746
15 Claims. (Cl. 198—34)

This invention relates to a spacing control circuit and more particularly to such a circuit which is suitable for providing an output signal capable of regulating the movement of objects in an automatic conveyor system.

Automatic conveyor systems are used quite extensively in canning, bottling, and other operations involving a flow of objects. In such systems, it is essential that the flow of products along the conveyor belts be accurately monitored to assure that there be a continuous movement of such objects with proper spacing therebetween. In controlling such flow, sensors are generally utilized to detect the presence or absence of objects at predetermined check points in the conveyor system. The outputs of these sensing devices are then fed to a control circuit which provides an output signal which is used to control the conveyor drive mechanism. Thus, for example if there should be a void in the conveyor line at the point where the sensor is located, the control circuit might operate to shut down the drive system to prevent a pile up of objects at some other point in the line.

In many spacing control devices of the prior art, the control circuits operate only to detect the presence or absence of objects in front of the sensor and cannot function to determine if the time interval between the arrival of objects before the sensor is proper. Some systems have the limitation that they can only check for a maximum predetermined spacing between objects, such spacing being the maximum spacing which would provide continuous contiguity between the moving objects and the sensing heads. Many prior art control devices while not subject to this limitation, tend to be overly complicated in their construction and operation. This tends to increase their cost of manufacture and often presents problems as to their reliability of operation.

The device of this invention overcomes the shortcomings of prior art spacing control circuits in providing a simple circuit capable of reliably checking for a predetermined desired spacing between objects. The spacing criterion can readily be changed when desired. This end result is achieved in the device of the invention by utilizing a pair of delay units. One of these delay units operates to actuate an electronic control a predetermined time interval after the presence of objects at a particular point on the conveyor line is sensed. The other of these delay units operates to actuate a second electronic control a predetermined time interval after the absence of objects on the conveyor line is sensed. The electronic controls operate to control drive means for the conveyor system. Thus, the conveyor system will be stopped should there be more than first determined delay between the arrival of objects in front of the presence detection device and will be started up again is predetermined time interval after such objects again appear. Means are provided in each of the delay units to change the time interval of the operation thereof. Thus, a simple yet highly versatile control circuit is provided which is capable of operation under various preselected operating criteria.

It is therefore an object of this invention to provide an improved spacing control circuit of relatively simple design.

It is a further object of this invention to provide a simple yet highly reliable spacing control circuit capable of more versatile operation than prior art devices.

It is still another object of this invention to provide an improved spacing control circuit capable of checking the spacing between objects on a conveyor belt over a wider range of adjustment than similar prior art devices.

It is still a further object of this invention to provide an improved spacing control circuit having means for delaying the operation of a conveyor system a predetermined time interval after the presence of objects is detected and delaying the starting of such conveyor system a predetermined time interval after the absence of such objects is detected.

Figure 2:
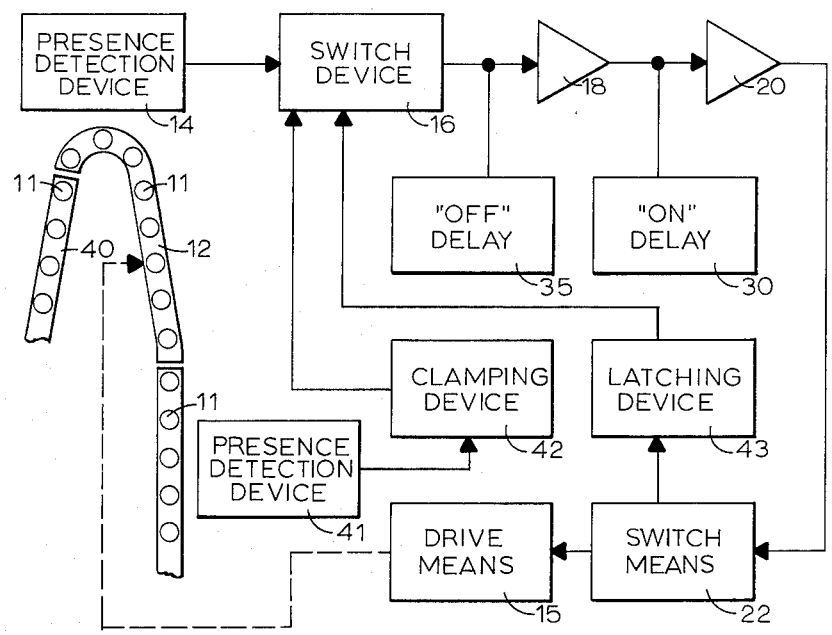
Figure 3:
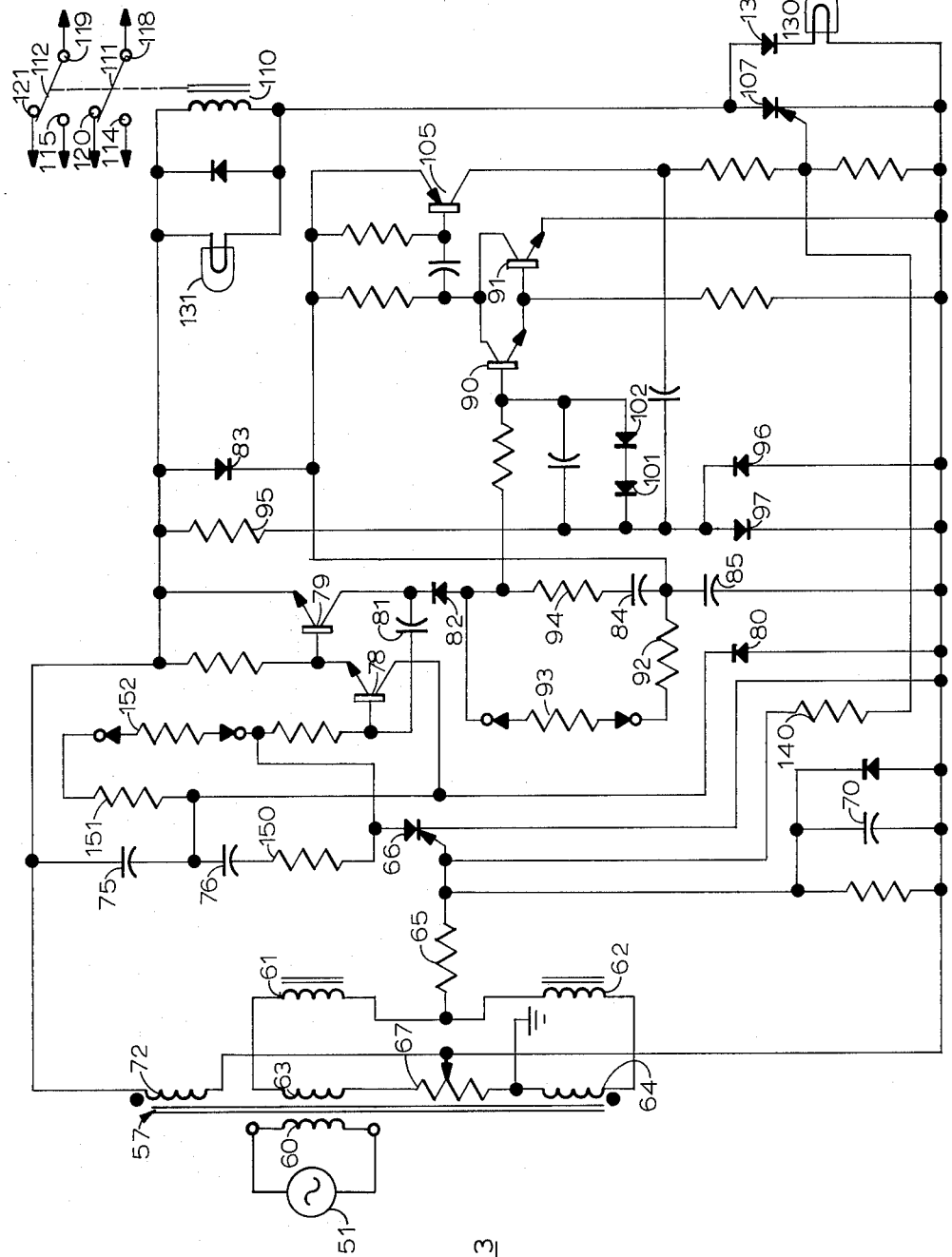
Figure 4:
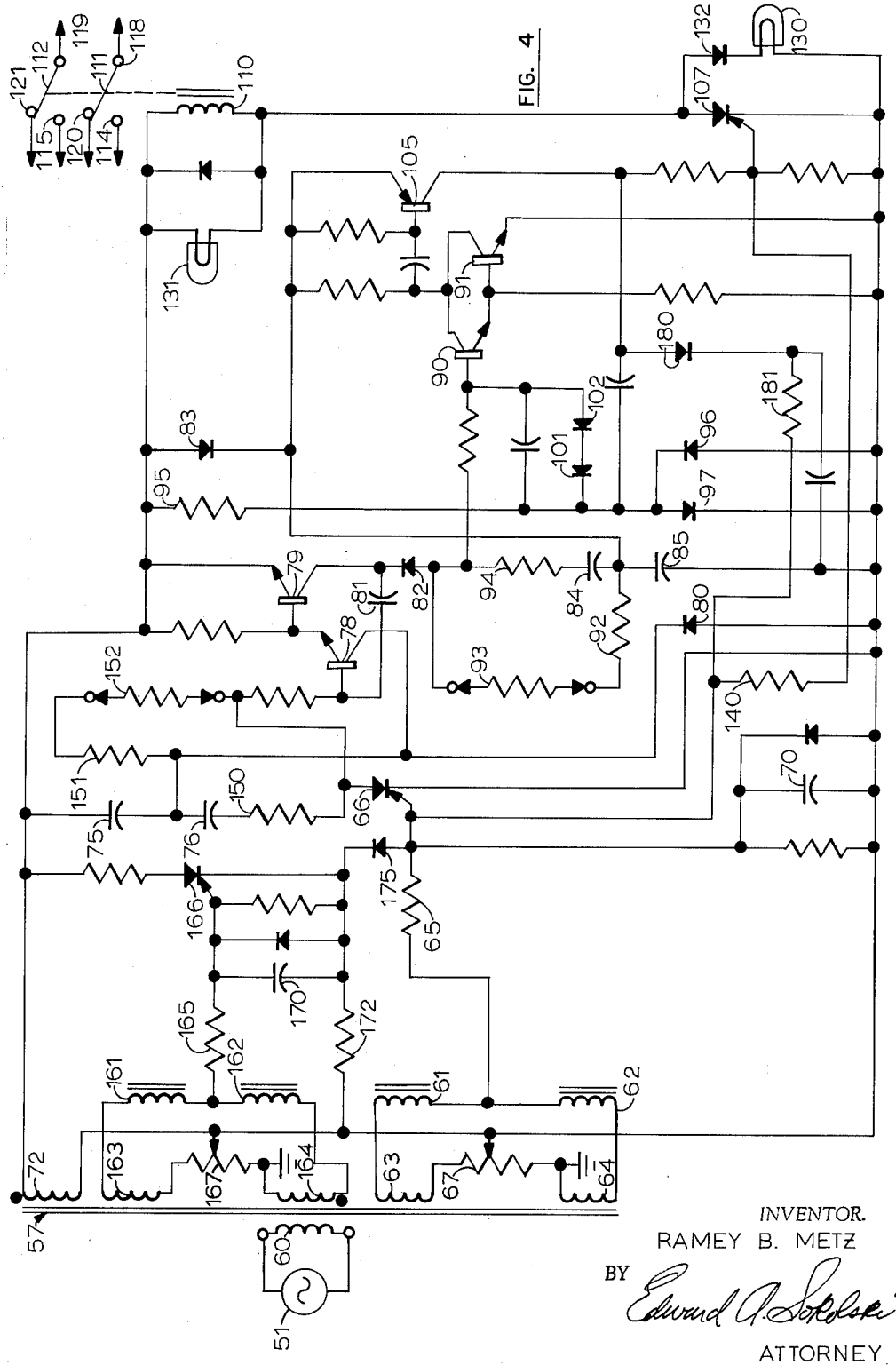

Other objects of this invention will become apparent from the following description taken in connection with the accompanying drawings of which FIG. 1 is a block diagram illustrating the basic operation of the device of the invention, FIG. 2 is a block diagram illustrating the basic operation of a modified version of the device of the invention, FIG. 3 is a schematic diagram illustrating the details of circuitry of a first embodiment of the device of the invention, and FIG. 4 is a schematic diagram illustrating the details of circuitry of a second embodiment of the device of the invention.

Referring now to FIG. 1, a block diagram illustrating the basic operation of the device of the invention is shown. Objects 11 which may, for example, be cans are moved on conveyor belt 12 past presence detection device 14. Conveyor belt 12 is driven along by drive means 15 which may include an electric motor. Presence detection device, which may comprise a magnetic or a capacitive sensor, produces an output signal indicative of the presence or absence of an object 11 within a predetermined distance therefrom. The output of presence detection device 14 is fed to switch device 16. When one of objects 11 is within the predetermined distance range of presence detection device 14, the output of the presence detection device is such as to drive switch device 16 to one state while when there is no object 11 within the determined distance range, switch device 16 goes to an opposite state. Thus, for example, switch device 16 may be in the "open" or non-conducting state in the absence of an object 11 within the detection range of the presence detection device and may be in the "closed" or conducting state when objects come within the detection range.

Amplifier 18 is normally in one state, for example, conducting while amplifier 20 is in an opposite state, for example, non-conducting in the absence of objects within the detection range. Under such operating conditions, when an object is within the detection range, switch device 16 may be closed to cause amplifier 18 to be driven to cut-off. The output of amplifier 18 is connected to amplifier 20 so that when amplifier 18 is driven to cut-off, amplifier 20 is driven into conduction. Thus, with objects within the detection range, amplifier 20 is driven into conduction and inturn closes switch means 22. Switch means 22 is connected to drive means 15 and activates said drive means when in the closed state. Conveyor 12 is thus driven by drive means 15 when objects 11 are detected by presence detection device 14. Quite obviously, if so desired for a particular application, the operation may be reversed so that drive means 15 will only drive the conveyor 12 in the absence of objects 11 within the detection range, merely by reversing the operation of switch means 22 as, for example, by utilizing switch means including a relay having normally closed contacts which are opened when the relay is actuated.

The time interval between the arrival of an object 11 within the detection range of presence detection device 14 and initial actuation of drive means 15 is controlled by means of "on" delay 30. "On" delay 30 may comprise a time delay network utilizing passive elements and is interposed in the bias control circuit for amplifier 20. "On" delay 30 delays the firing of amplifier 20 after amplifier 18 is cut off for a period which is determined by the time constant of the network. Means are provided to change the time constant of delay 30 to suit various application demands. Thus with objects arriving on the conveyor belt 40 controlled by a separate drive system (not shown), it may be desired to delay the starting of conveyor 12 for a predetermined interval after an object 11 comes on conveyor 40 within the range of presence detection device 14. Such delay is controlled by means of "on" delay 30.

"Off" delay 35 is interposed in the bias control circuit for amplifier 18. "Off" delay 35 similarly to "on" delay 30 comprises a time delay network. "Off" delay 35 controls the firing of amplifier 18 when switch device 16 opens. Thus, for a period, as determined by the time constant of the delay network of "off" delay 35, after the absence of objects 11 has been first sensed by presence detection device 11, amplifier 18 will be maintained in a non-conducting state and drive means 15 be actuated. The details of operation of a specific embodiment of the device of the invention incorporating the basic features illustrated in FIG. 1 will be explained further on in the specification in detail in connection with FIG. 3.

Referring now to FIG. 2, the basic operation of a second embodiment of the invention utilizing dual control is illustrated. In the embodiment of FIG. 2, operation is similar to that of the embodiment of FIG. 1 except for the addition of a second presence detection device 41, clamping device 42, and latching device 43. The embodiment of FIG. 2 is useful where it is desired that the conveyor 12 be initially driven by drive means 15 only after objects 11 have been within the detection range of both presence detection devices 14 and 41 for a predetermined time interval.

Switch device 16 is clamped by clamping device 42 in the absence of objects within the detection range of presence detection device 41 so that it cannot be activated despite an output signal thereto from presence detection device 14 indicating the presence of objects within its detection range. Clamping device 42 is controlled by presence detection device 41 so that the clamping action will be removed from switch device 16 with the detection of objects by presence detection device 41. Thus, with output signals from both presence detection devices indicating the presence of objects within their respective ranges for a preset minimum time and only under such conditions, switch device 16 will be closed to cause drive means 15 to be activated in the same fashion as is described in connection with FIG. 1.

Once switch means 22 and drive means 15 have been activated, such activation will be maintained even in the absence of an object within the range of presence detection device 14. This end result is achieved by means of latching device 43 which feeds a large amount of positive feedback from switch means 22 to maintain switch device 16 conductive as long as there is an output from presence detection device 41 indicating the presence of objects within its range. Thus, the conveyor drive is instituted only when there are objects within the ranges of both presence detection devices and is stopped a predetermined interval (as determined by "off" delay 35) after there are no longer any objects within the range of presence detection device 41 in itself. This dual control system is useful in situations where dual criteria as to the presence of objects at different portions of the conveyor system are required. The details of operation of an embodiment in accordance with the basic configuration shown in FIG. 2 will be explained in connection with FIG. 4.

Referring now to FIG. 3, a first embodiment of the device of the invention is illustrated in schematic form. One end of sensing coil 61 and reference coil 62 is connected respectively to an end of winding 63 and winding 64 of transformer 57. The other ends of windings 61 and 62 are connected together. Windings 61–64 form a balanced bridge circuit. The primary winding 60 of transformer 57 is energized by A.C. power source 51.

Sensing coil 61 is utilized to detect the presence or absence of ferro-magnetic material. When a ferro-magnetic object approaches sensing coil 61, the inductance of the coil changes to cause an unbalancing of the bridge circuit. Silicon controlled rectifier 66 is normally in a cutoff condition. With such unbalancing of the bridge, an A.C. signal is applied to the gate of the silicon controlled rectifier in proper phase to cause the silicon controlled rectifier to fire. The sensitivity of the sensing coil, as indicated by the distance of ferrous objects from sensing coil 61 at which the silicon controlled rectifier will fire, can be preset by setting the tap on variable resistor 67. This slightly unbalances the bridge and in effect provides a biasing signal for the control gate of silicon controlled rectifier 66.

Resistor 65 and capacitor 70 provide a low pass filter which minimizes the effects of electrical transients which might cause false triggering of the silicon controlled rectifier. Transformer winding 72 supplies power through capacitors 75 and 76 to the anode of silicon controlled rectifier 66.

The gating control signal fed to silicon controlled rectifier 66 from the unbalanced bridge circuit, in the presence of ferro-magnetic objects, has a phase relationship with the voltage fed to the rectifier from supply transformer 72 such as to cause silicon controlled rectifier 66 to fire.

Transistor 78 is normally conducting when silicon controlled rectifier 66 is cutoff. Capacitors 75 and 76 operating in conjunction with diode 80 and silicon controlled rectifier 66 form a voltage doubling rectifier circuit which charges capacitor 76 to twice the peak voltage supplied by transformer winding 72. The voltage thus produced across capacitor 76 back biases transistor 78, which up to this time had been conducting, to beyond cutoff. This voltage doubling action produces an unequivocal cutoff signal which assures that transistor 78 is driven to and held beyond cutoff even if circuit parameters should change over long periods of time.

With transistor 78 at cutoff, transistor 79 operated in cascade therewith is similarly driven to cutoff. A feedback signal is fed through capacitor 81 to sharpen the cutoff action of transistors 78 and 79.

A voltage doubler rectifier circuit similar to the circuit including capacitor 76 is formed by diodes 82 and 83 and capacitors 84 and 85. With transistors 78 and 79 conducting, this voltage doubler circuit which is fed by transformer winding 72, acts to charge capacitor 84 to twice the peak voltage output of transformer winding 72. The voltage across capacitor 84, under such conditions, acts to back bias transistor 90 beyond cutoff. When transistor 79 is driven to cutoff, capacitor 84 commences to discharge through resistors 92, 93 and 94. In a time period determined by the R.-C. time constant of capacitor 84 and resistors 92–94, the voltage at the base of transistor 90 will finally reach the firing point of this transistor, and it will start to conduct. Thus, the firing time of transistor 90 is delayed in accordance with the R.-C. time constant of the delay network formed by resistors 92–94 and capacitors 84. This delay network corresponds to the "on" delay 30 of FIG. 1. Resistor 93 as indicated is mounted so that it can be plugged in and removed. The time delay thus can be changed by replacement of resistor 93.

A square wave synchronizing signal is generated by means of the circuit including resistor 95 and diodes 96 and 97 by virtue of the A.C. signal applied thereto from transformer winding 72. The negative half cycle of this square wave is fed through diodes 101 and 102 to the base of transistor 90 to provide synchronous conduction of the transistor at the frequency of power source 51.

When transistor 90 starts conducting, it drives cascaded transistor 91 into conduction along with it. Transistors 90 and 91 are driven by the square wave synchronizing voltage to produce a square wave input voltage in synchronization with the power source 51, at the base of transistor 105. The square wave signal is amplified by transistor 105 and fed to the gating control of silicon controlled rectifier 107.

Silicon controlled rectifier 107 is caused to be gated on and off at the line frequency. Silicon controlled rectifier 107 controls the power fed to relay 110, and when silicon controlled rectifier is fired on and off at the line frequency, sufficient average power is supplied thereto to hold the arms 111 and 112 of relay 110 in the down position in contact with terminals 114 and 115 respectively. Relay 110 may be utilized to convey power from terminals 118 and 119 to terminals 120 and 121 for use in actuating the drive mechanism for a conveyor system when the relay is activated or conversely may be utilized to provide such drive power to terminals 114 and 115 when the relay is deactivated. Thus, depending upon the mode of operation desired, a drive signal can be conveyed either when the presence of objects is being detected or in their absence.

Pilot lamp 130 is illuminated only when relay 110 is deenergized to indicate such condition. This end result is achieved in view of the synchronous "on"-"off" operation of rectifier 107 and by virtue of diode 132 which only permits the positive half cycle of the A.C. to pass through indicator lamp 130. Indicator lamp 131 is illuminated when relay 110 is activated to give positive indication of such condition.

Positive feedback is provided by means of resistor 140 which controls the amount of hysteresis in the circuit and thereby avoids relay chatter when the relay is opening and closing.

A predetermined time interval after there are no longer any ferro-magnetic objects before sensing coil 61, relay 110 is deactivated. This time interval is determined by the delay circuit including capacitor 76 and resistors 150, 151 and 152. This delay circuit corresponds to the "off" delay 35 of FIG. 1.

With objects no longer before sensor 61, the bridge is substantially restored to a balanced condition and silicon controlled rectifier 66 is restored to its nonconductive state. When this occurs, capacitor 76 discharges through resistors 150–152. In a time period determined by the R.-C. time constant of the circuit, the voltage across capacitor 76 decreases to a point where transistor 78 commences to conduct. This will cause silicon controlled rectifier 107 to be unfired and relay 110 to open. The time interval between the detection of the absence of objects by sensing coil 61 and the opening of relay 110 can be changed by replacement of resistor 152 which is a plug-in unit.

A variable resistor can be used in place of plug-in resistors 152 and 93 if desired, but to avoid personnel in the field tampering with these controls and thereby misadjusting the equipment unwittingly, plug-in type resistors have been found to be more satisfactory.

The circuit illustrated in FIG. 3 has been found to be of high reliability and of precision capabilities despite its simplicity. The utilization of the voltage doubler delay circuits enables precise firing and unfiring of the circuits coupled with a relatively wide range of delay adjustments for controlling the spacing gaps.

Referring now to FIG. 4, a second embodiment of the device of the invention is illustrated. This embodiment is similar to the one shown in FIG. 3 except for the addition of a second sensing control circuit which enables more versatile operation than the device illustrated in FIG. 3. The device illustrated in FIG. 4 is contemplated for operation of the type explained in conjunction with FIG. 2 where dual detection criteria are required. In the embodiment of FIG. 4, an additional sensing coil 161 and reference coil 162 similar to sensing and reference coils 61 and 62 are utilized.

Coils 161 and 162 are connected with transformer windings 163 and 164 to form a substantially balanced bridge. Variable resistor 167 is utilized to preset the distance from sensing coil 161 at which ferro-magnetic objects will cause sufficient unbalance in the bridge to result in the firing of silicon controlled rectifier 166. Resistor 165 and capacitor 170 provide a low-pass filter which minimizes electrical transient which might spuriously fire silicon controlled rectifier 166. The circuit described thus far operates to fire silicon controlled rectifier 166 in similar fashion to the circuit utilized in the firing of silicon controlled rectifier 66.

In the absence of objects before sensing coil 161, and with rectifier 166 unfired, diode 175 acts to clamp any incoming signal which may appear at the control gate of rectifier 66 to a level which will prevent the firing of this rectifier despite the apperance of incoming signals sensed by sensor 61. Thus, despite the presence of objects before this sensing coil, if there are no objects before coil 161, silicon controlled rectifier 66 will not fire.

With the appearance of an object before sensing coil 161, silicon controlled rectifier 166 will fire. With such firing, a voltage is developed across resistor 172 to back bias diode 175 and hold such diode in a nonconducting state. This removes the clamping action by diode 175 from silicon controlled rectifier 66 and permits it to fire in a normal manner with the next arrival of ferro-magnetic objects before sensing coil 61. It is necessary therefore, in the device of FIG. 4, that objects appear simultaneuosly before both sensing coils 161 and 61 for a predetermined length of time as dicated by the time constant of the delay network including capacitor 84. Dual conditions are thus established for the closing of relay 110, namely the appearance of objects simultaneously before both sensing heads for the predetermined period of time. As already indicated in connection with FIG. 2, sensing heads 161 and 61 are placed at different conveyor line points in achieving the desired end result.

Once relay 110 has been closed by virtue of the proper actuation of the circuit, a large amount of positive feedback is fed from transistor 105 through diode 180 and resistor 181 to the control gate of silicon controlled rectifier 66. This feedback is of such a magnitude that it keeps silicon controlled rectifier 66 in a conductive state even though there is no longer a firing input signal from sensing coil 61. This, in effect, latches relay 110 until silicon controlled rectifier 166 is unfired with the absence of objects before sensing coil 161, and the clamping action of diode 175 is thus restored. In this manner, relay 110 is effectively latched closed with the simultaneous appearance of signals before both sensing heads and is maintained in this closed position even though there are no longer objects before sensing head 61. The relay is finally opened only when objects are no longer present before sensing head 161.

It is to be noted that the basic control circuits shown may be utilized with other than magnetic sensors and are adaptable for utilization, for example, with capacitive type sensing devices. The basic requirement remains, however, that the sensor must have an A.C. output signal of a synchronous nature.

The device of this invention thus provides a simple yet highly effective means for precise control of the flow of objects in a conveyor system. The control circuits of the invention are readily adaptable for utilization in various modes of operation, making for a highly versatile system.

While the invention has been described and illustrated in detail it is to be clearly understood that this is intended by way of illustration and example only, and is not to be taken by way of limitation, the spirit and scope of this invention being limited only by the terms of the following claims.

I claim:
1. In combination, drive means for driving a conveyor line having objects thereon and control means for controlling said drive means to regulate the flow of said objects, said control means comprising
   sensing means for detecting the presence or absence of said objects at a predetermined point on said line, and
   electronic control means responsive to said sensing means for providing a first predetermined control signal to said drive means when said sensing means detects the presence of objects and a second predetermined control signal to said drive means when said sensing means detects the absence of objects, said electronic control means including amplifier means, first delay means connected to said amplifier means for delaying said first predetermined control signal a predetermined time interval after the presence of objects is first sensed and second delay means connected to said amplifier means for delaying said second predetermined control signal a predetermined time interval after the absence of said objects is first sensed.

2. In combination, drive means for driving a conveyor line having objects thereon and control means for controlling said drive means to regulate the flow of said objects, said control means comprising,
   sensing means for detecting the presence or absence of said objects at a predetermined point on said line, and
   electronic control means responsive to said sensing means for providing a first predetermined control signal to said drive means when said sensing means detects the presence of objects and a second predetermined control signal to said drive means when said sensing means detects the absence of objects, said electronic control means including first and second amplifiers, one of said amplifiers conducting when the other of said amplifiers is non-conducting, first delay means interposed in the bias circuits of one of said amplifiers for delaying said first predetermined control signal a predetermined time interval after the presence of objects is first sensed and second delay means interposed in the bias circuit of the other of said amplifiers for delaying said second predetermined control signal a predetermined time interval after the absence of said objects is first sensed, the commencement of conduction of said one of said amplifiers corresponding to the commencement of said first control signal, the commencement of conduction of said other of said amplifiers corresponding to the commencement of said second control signal.

3. In a system including an electronic circuit for controlling the flow of objects on a conveyor line,
   means for sensing the presence or absence of objects at a predetermined point on said line,
   first switch means responsive to said sensing means for producing an output signal in accordance with the output thereof,
   amplifier means responsively connected to said first switch means for amplifying the output received therefrom,
   drive means for driving said conveyor line,
   second switch means connected to receive the output of said amplifier means for controlling the operation of said drive means, said second switch means being actuated and deactuated by the output of said amplifier means,
   first delay means connected to said amplifier means for delaying the actuation of said second switch means a predetermined time interval after the sensing of the presence of objects by said sensing means, and
   second delay means connected to said amplifier means for delaying the deactuation of said second switch means a predetermined time interval after the sensing of the absence of objects by said sensing means.

4. The system as recited in claim 3 wherein said sensing means comprises a magnetic sensor position in close proximity to said line.

5. The circuit as recited in claim 3 wherein said amplifier means includes at least two amplifiers, said first delay means being connected in the control bias circuit of one of said amplifiers, said second delay means being connected in the control bias circuit of the other of said amplifiers.

6. In a system including an electronic circuit for controlling the flow of objects on a conveyor line,
   means for sensing the presence or absence of objects at a predetermined point on said line,
   first switch means responsive to said sensing means for producing an output signal in accordance with the output thereof,
   first and second cascaded amplifiers responsively connected to said first switch means for amplifying the output received therefrom, one of said amplifiers conducting when the other of said amplifiers is non-conducting,
   drive means for driving said conveyor line,
   second switch means connected to receive the output of said first and second amplifiers for controlling the operation of said drive means, said second switch means being actuated and deactuated by the output of said amplifiers,
   first delay means connected in the bias circuit of one of said amplifiers for delaying the conduction of said one of said amplifiers and the actuation of said second switch means a predetermined time interval after the sensing of the presence of objects by said sensing means, and
   second delay means connected in the bias circuit of the other of said amplifiers for delaying the conduction of said other of said amplifiers and the deactuation of said second switch means a predetermined time interval after the sensing of the absence of objects by said sensing means.

7. The system as recited in claim 6 wherein said sensing means comprises a magnetic sensor positioned in close proximity to said line.

8. A circuit for controlling the operation of drive means for driving a conveyor line having objects thereon comprising
   an A.C. power source,
   sensing means forming a bridge circuit and including a sensor positioned along said conveyor line, said bridge circuit being unbalanced when one of said objects is proximate to said sensor, said A.C. power source providing a reference signal for said bridge circuit,
   first switch means responsively connected to the output of said bridge circuit,
   first amplifier means responsively connected to the output of said first switch means,
   second amplifier means responsively connected to the output of said first amplifier means,
   first and second delay means connected in the control bias circuits of said first and second amplifier means respectively, and
   second switch means responsively connected to the output of said second amplifier means, said second switch means being connected to control said drive means.

9. The circuit as recited in claim 8 and further including means responsive to said A.C. power source for synchronously causing said second switch means to be activated at the frequency of said power source in response to the output of said second amplifier means.

10. The circuit as recited in claim 8 wherein said first and second delay means each comprises and R.-C. delay line connected in a voltage doubler rectifier circuit.

11. A delay circuit for use in delaying the operation of an electronic control device a predetermined time interval after the arrival of an input signal comprising
an A.C. power source,
electronic means including rectifier means connected to said A.C. power source and means for controlling the flow of current from said power source through said rectifier means in response to said input signal,
first and second capacitors connected in series between one of the elements of said rectifier means and one of the terminals of said A.C. power source, the other of the elements of said rectifier means being connected to the other of the terminals of said A.C. power source,
a rectifier connected between the other of the terminals of said power source and the junction between said first and second capacitors, and
an R.-C. charging circuit including said second capacitor,
the junction between said first and second capacitors being connected to the control element of said control device,
said capacitors, said rectifier and said rectifier means forming a voltage doubler rectifier circuit,
whereby said second capacitor charges to twice the peak voltage of said power source and discharges in response to said input signal to control the operation of said electronic control device.

12. A spacing control for controlling the spacing of objects on a conveyor line comprising
means for driving said conveyor line,
first and second presence detection means for detecting the presence or absence of objects at predetermined separate points on said line,
a switch device, the output of said first presence detection means being connected to said switch device,
clamping means connected to said switch device for clamping said switch device beyond cutoff when there are no objects before said second presence detection means, the output of said second presence detection means being connected to said clamping means,
drive means for driving said conveyor line,
switch means for controlling the operation of said drive means,
first and second amplifier means connected in cascade with each other between said switch device and said switch means for amplifying the output of said switch device,
first and second delay means connected in the control bias circuits of said first and second amplifier means respectively, one of said delay means providing a predetermined delay in the firing of said switch means, the other of said delay means providing a predetermined delay in unfiring of said switch means, and
latching means responsive to the output of said switch means for maintaining said switch device in the activated state in the absence of output signals from said first presence detection device and the presence of output signals from said second presence detection device.

13. The spacing control as recited in claim 12 wherein said first and second delay means each includes an R.-C. delay line connected in a voltage doubler circuit.

14. In combination, drive means for driving a conveyor line having objects thereon and control means for controlling said drive means to regulate the flow of said objects, said control means comprising
sensing means for detecting the presence or absence of said objects at a predetermined point on said line, and
electronic control means responsive to said sensing means for providing a first predetermined control signal to said drive means when said sensing means detects the presence of objects and a second predetermined control signal to said drive means when said sensing means detects the absence of objects, said electronic control means including first and second amplifiers, a first R.-C. delay line interposed in the control bias circuit of said first amplifier for delaying said first predetermined control signal a predetermined time interval after the presence of said objects is first sensed, and a second R.-C. delay line interposed in the control bias circuit of said second amplifier for delaying said second predetermined control signal a predetermined time interval after the absence of said objects is first sensed.

15. The device as recited in claim 14 wherein each of said R.-C. delay lines includes a voltage doubler rectifier circuit.

References Cited by the Examiner

UNITED STATES PATENTS 2,707,142 4/55 Waite _____ 312—71

SAMUEL F. COLEMAN, *Primary Examiner.*

RICHARD E. AEGERTER, *Examiner.*